G. W. KENDALL.
CULTIVATOR.
APPLICATION FILED MAY 9, 1919.
1,322,455.
Patented Nov. 18, 1919.
2 SHEETS—SHEET 1.
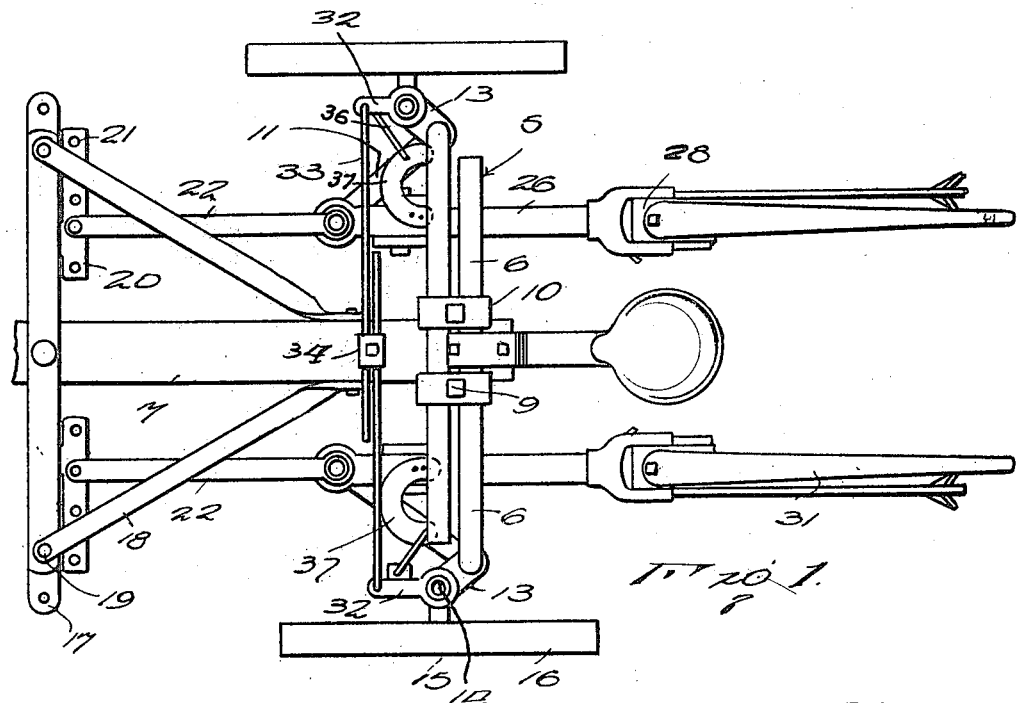
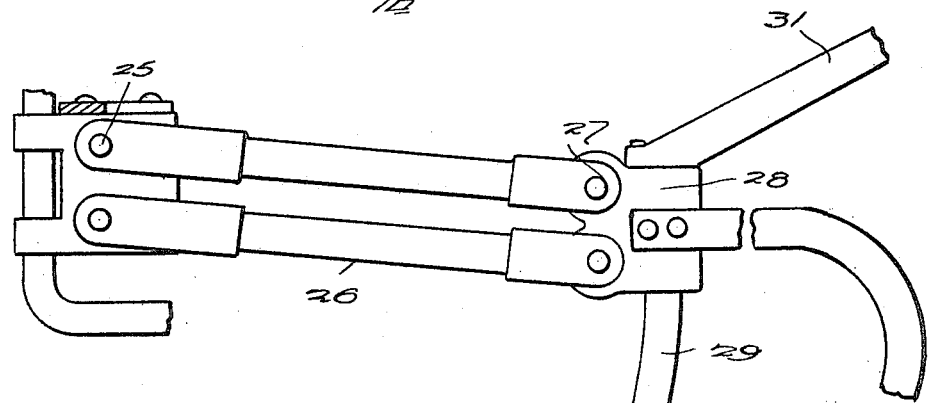

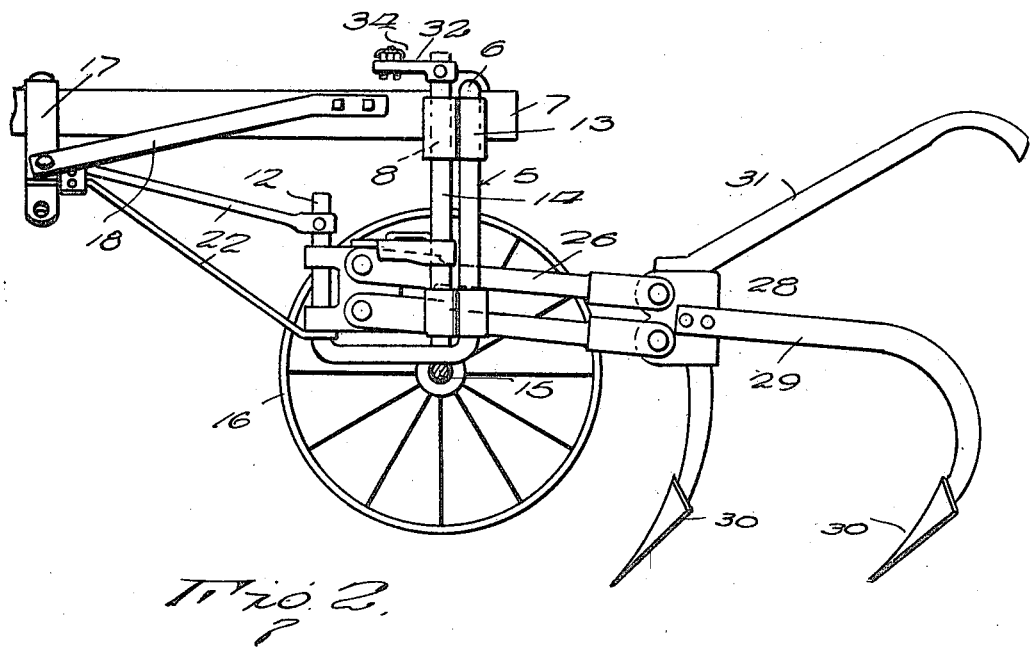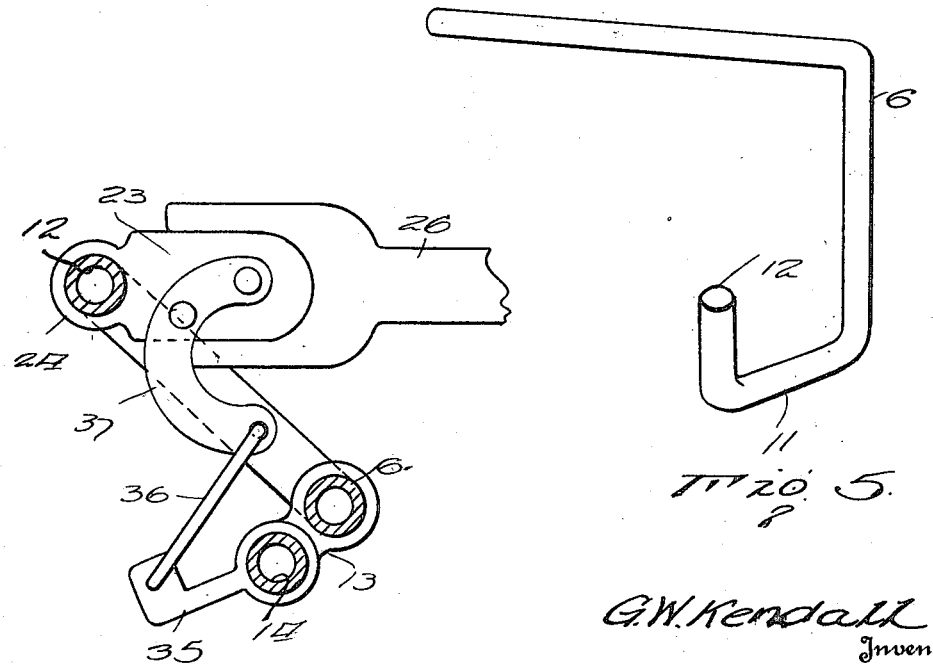

UNITED STATES PATENT OFFICE.

GEORGE W. KENDALL, OF SEADRIFT, TEXAS.

CULTIVATOR.

1,322,455.	Specification of Letters Patent.	Patented Nov. 18, 1919.

Application filed May 9, 1919. Serial No. 295,883.

*To all whom it may concern:*

Be it known that I, GEORGE W. KENDALL, a citizen of the United States, residing at Seadrift, in the county of Calhoun and State of Texas, have invented certain new and useful Improvements in Cultivators, of which the following is a specification.

This invention relates to improvements in cultivators of that type in which the ground working elements are arranged and operated in groups or gangs and the invention has for its object to provide an adequate mechanism whereby the several ground working elements of each series are held level or in the same horizontal plane irrespective of the respective or independent vertical adjustment of the groups.

Another object is the provision of an improved cultivator frame structure in which the supporting wheels therefor are controlled by the ground working elements in order to shift the position of the supporting wheels as the cultivator takes a turn.

With these and other objects in view as will appear as the description proceeds the invention comprises the novel features of construction combination of elements and arrangements of parts which will be more fully described in the following specification as set forth with particularity in the claims appended hereto.

Figure 1 represents a plan view of the improved cultivator,

Fig. 2 is a side elevation of the cultivator, the adjacent wheel being removed,

Fig. 3 represents an enlarged fragmentary side elevation of one of the groups of gangs of ground working elements illustrating the supporting and draft means therefor, Fig. 4 represents an enlarged horizontal sectional view illustrating the connection between the plow beams and supporting wheel in detail, and Fig. 5 represents a perspective view of one of the companion frame members detached.

Referring to the drawings in detail, wherein similar reference numerals designate corresponding parts throughout the several views, the numeral 5 indicates generally the frame structure of the cultivator which embodies such features of adjustment as to permit of the width of the frame to be varied according to the character of the work to be accomplished and which consists of a pair of companion frame members substantially U-shaped in form as indicated at 6 having the horizontally disposed portions thereof arranged side by side and above the draft beam 7. A stop 8 is engaged with the underside of the draft beam 7 and receives vertically extending bolts 9 coacting with a pair of clamping plates 10 whereby the L-shaped frame members 6 are rigidly clamped in adjusted position with relation to the beam 7. The lower terminals of the vertically disposed portions of the L-shaped members 6 are connected by the horizontally extending portions 11 with the uprights 12 which, as will hereinafter be more fully described, constitute the supports for the ground working elements.

Laterally projecting bearing members 13 having vertically alined openings are rigidly connected with and extend forwardly of the vertical portions of the frame members 6 and pivotally support the vertical shafts 14 the lower terminals of which are connected with the stub-axles 15 carrying the supporting wheels 16 above which the cultivator is conveyed.

A transverse bar 17 is secured medially to the draft beam 7 at a point forwardly of the frame members 6 and is connected therewith by rearwardly converging braces 18, the outer terminals of the terminals being engageable with the transverse bar 17 at various points throughout the length of the latter by engaging the bolts 19 in any one of a series of apertures formed longitudinally of the bar 17. Attaching plates 20 having a series of vertical apertures 21 therein are rigidly secured to the terminals of the bar 17 and are engaged with the rearwardly extending braces 22 which latter are arranged in rearwardly diverging pairs and are connected, respectively, with the uprights 12 carried by the respective frame members 16 each vertical upright 12 pivotally supports a block 23 carrying forwardly directed and apertured bearings 24 receiving the uprights and provided with horizontal and parallel hinge bolts 25. Each block is pivotally connected by the bolts 25 with a pair of parallel cultivator beams 26 having connection at 27 with the heads 28 to which are secured the vertically and horizontally extended terminals of a pair of standards 29 carrying plow blades 30 at their lower terminals. If preferred, handles 31 may be applied to the heads 28 and it is evident that the action of the parallel beams 26 maintain the points of the blades 30 of each group of ground working elements in horizontal alinement regardless of the vertical adjustment thereof.

The shafts 14 are mounted to oscillate in the bearings 13 whereby the angular relation of the wheels 16 to the cultivator frame 5 may be varied in order to turn short corners and the movement of one wheel is transmitted to the other through the laterally projecting arms 32 connected with the upper terminals of the shafts 14 and having connection with each other through a pair of rods 33 the adjacent terminals of which are adjustably clamped together between clamping plates 34. By proper adjustment of the connecting rods 33 the supporting wheels 16 may be maintained in proper parallel relation.

Each of the shafts 14 is also provided intermediate its ends with a second arm 35 having connection to a link 36 with a curved arm 37 attached to the adjacent pivoted block 23 whereby the movement of the parallel beams 26 pivotally upon the uprights 12 is transmitted to the shafts 14 to turn the wheels in the direction of travel of the draft animals. For instance, during the left hand turn the ground working elements 30 following the wheel mounted frame 5 incline to the left, with relation to the draft beam 7 and movement is transmitted to the shafts 14 through the arm 37, links 36 and arm 35 to cause the supporting wheels 16 to assume such position as to turn a short corner. When the turn has been made and the plow beams 26 assume their normal parallel relation to the draft beam 7, the supporting wheels 16 are restored to their initial position in order to present minimum resistance to the forward movement of the cultivator.

What is claimed is:

1. A cultivator including a wheel mounted frame, an upright carried thereby, a block pivotally supported by the upright, a group of ground working elements, a head connected with the elements, and parallel beams pivotally connected at their opposite terminals with the block and with the head whereby the ground working elements are maintained in horizontal alinement during vertical adjustment thereof.

2. A cultivator including a frame structure consisting of a pair of substantially L-shaped members provided with horizontally and vertically extending portions, a draft beam, means adjustably connecting the horizontally extending portions of the L-shaped members with the beam, whereby the width of the frame structure may be varied, forwardly and inwardly directed members carried by the lower terminals of the frame structure, uprights connected with the last mentioned members, groups of ground working elements extending rearwardly from the uprights, vertically disposed shafts swingably connected with the vertically disposed portions of the frame members, and supporting wheels carried by said shafts.

3. A cultivator including a frame structure, vertical shafts carried thereby and having a limited oscillatory movement, supporting wheels carried by the shafts, uprights carried by the frame structure, rearwardly extending beams pivotally connected with the uprights, groups of ground working elements carried by the beams, and means connecting the beams with the wheels whereby the latter, together with the shafts are caused to move as the angular relation of the beams and frame structure varies.

4. A cultivator including a frame structure, vertical shafts pivotally supported thereby, supporting wheels carried by the shafts, arms carried by the shafts, uprights carried by the frame structure, rearwardly extending plow beams carried by the uprights and pivotally supported thereby, plows carried by the beams, and link connections between the shafts and beams.

In testimony whereof I affix my signature hereto.

GEORGE W. KENDALL.